(12) United States Patent
Oka (10) Patent No.: US 9,983,425 B2
(45) Date of Patent: *May 29, 2018

(54) DISPLAY DEVICE (71) Applicant: Japan Display Inc., Tokyo (JP)

(72) Inventor: Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/693,528

(22) Filed: Sep. 1, 2017

(65) Prior Publication Data

US 2018/0011366 A1 Jan. 11, 2018

Related U.S. Application Data (63) Continuation of application No. 15/363,095, filed on Nov. 29, 2016, now Pat. No. 9,778,499.

(30) Foreign Application Priority Data

Jan. 7, 2016 (JP) .................. 2016-001978

(51) Int. Cl.
*G02F 1/1333* (2006.01)
*G02F 1/1335* (2006.01)

(52) U.S. Cl.
CPC .. *G02F 1/133305* (2013.01); *G02F 1/133345* (2013.01); *G02F 1/133514* (2013.01); *G02F 2201/121* (2013.01); *G02F 2201/123* (2013.01); *G02F 2201/503* (2013.01)

(58) Field of Classification Search
CPC ......... G02F 1/133305; G02F 1/133345; G02F 1/133514

See application file for complete search history.

(56) References Cited

U.S. PATENT DOCUMENTS 9,778,499 B2 * 10/2017 Oka ................. G02F 1/133305
2009/0206749 A1 8/2009 Matsudate et al.

FOREIGN PATENT DOCUMENTS

| JP | H9-311324 A | 12/1997 |
| JP | 2009-186885 A | 8/2009 |
| JP | 2009-193797 A | 8/2009 |
| JP | 2013-235196 A | 11/2013 |

* cited by examiner

*Primary Examiner* — Joseph L Williams
(74) *Attorney, Agent, or Firm* — Typha IP LLC (57) ABSTRACT A liquid crystal display device includes a first substrate having a pixel electrode and a common electrode provided thereon; a second substrate formed of a resin material; a liquid crystal layer provided between the first substrate and the second substrate; an optical film facing the liquid crystal layer with the second substrate being provided between the optical film and the liquid crystal layer; and a conductive layer facing the second substrate; wherein the optical film is provided between the conductive layer and the second substrate.

20 Claims, 10 Drawing Sheets

DISPLAY DEVICE

CROSS REFERENCE TO RELATED APPLICATIONS

This application is a continuation of U.S. patent application Ser. No. 15/363,095, filed on Nov. 29, 2016. Further, this application is based upon and claims the benefit of priority from the prior Japanese Patent Application No. 2016-001978, filed on Jan. 7, 2016, the entire contents of which are incorporated herein by reference.

FIELD

The present invention relates to a flexible liquid crystal display device; for example, a liquid crystal display device including a resin substrate as a substrate included in a liquid crystal cell.

BACKGROUND

Conventionally, a liquid crystal display device including a flexible substrate as a substrate included in a liquid crystal cell is known. An example of flexible substrate is a substrate formed of a resin (resin substrate). Such a liquid crystal display device may be entirely curved or folded, and may be treated as paper. For such a property, a liquid crystal display device including a flexible substrate (namely, a flexible liquid crystal display device) is also called a "sheet display".

A flexible substrate included in a liquid crystal display device is much thinner than a glass substrate. Therefore, a highly rigid substrate needs to be used in order to support the flexible substrate in a production process of the liquid crystal display device. A liquid crystal display device including a flexible substrate is produced as follows, for example. A resin layer is formed on a glass substrate, and a semiconductor device and the like are formed on the resin layer. Then, after a liquid crystal cell is completed, the glass substrate and the resin layer are peeled off from each other. Thus, the resin layer acts as a flexible substrate of the liquid crystal display device. Japanese Laid-Open Patent Publication No. 2013-235196 describes a flexible liquid crystal display device produced in such a production process.

SUMMARY

A liquid crystal display device in an embodiment according to the present invention includes a first substrate having a pixel electrode and a common electrode provided thereon; a second substrate formed of a resin material; a liquid crystal layer provided between the first substrate and the second substrate; an optical film facing the liquid crystal layer with the second substrate being provided between the optical film and the liquid crystal layer; and a conductive layer facing the second substrate with the optical film being provided between the conductive layer and the second substrate. The conductive layer may be a layer containing a conductive polymer or a transparent conductive layer.

DESCRIPTION OF EMBODIMENTS

In the case where a liquid crystal display device is driven by a display mode such as, for example, IPS (In-Plane Switching) or FFS (Fringe Field Switching), a conductive layer is occasionally located on a surface of the liquid crystal display device that is closer to a user than a liquid crystal layer (such a surface will be referred to as a "display plane") as a measure against electrostatic charges.

This measure against electrostatic charges is provided for the purpose of securing the potential of the conductive layer at a constant level so that an electric shield is formed between the electrostatic charges and the liquid crystal layer. In the case where, for example, electrostatic charges are generated on the display surface by, for example, an operation made by a user on a touch panel, such a measure against the electrostatic charges decreases the influence of the electrostatic charges on the liquid crystal layer.

However, in the case where the above-described measure against the electrostatic charges is applied to a liquid crystal display device including a flexible substrate, a problem is caused by the manufacturing uniqueness thereof. In the case where, for example, a flexible substrate is used as a counter substrate of the liquid crystal display device, it is difficult to locate the conductive layer on a surface of the flexible substrate that is closer to the user because of a restriction caused by the production process. A specific reason for this is that since a resin layer is provided on a glass substrate and the glass substrate is peeled off in a final step, it is not possible to provide a conductive layer between the glass substrate and the resin layer.

Even if the conductive layer is located on the surface of the flexible substrate that is closer to the user, the influence of the electric shield is exerted on the liquid crystal layer itself because the resin layer used as the flexible substrate is very thin.

One of objectives of the present invention is to provide a technology for providing a measure against electrostatic charges while suppressing the influence of the measure exerted on the liquid crystal layer.

Hereinafter, embodiments of the present invention will be described with reference to the drawings. The present invention may be carried out in various forms without departing from the gist thereof, and is not to be construed as being limited to any of the following embodiments. In the drawings, components may be shown schematically regarding the width, thickness, shape and the like, instead of being shown in accordance with the actual sizes, for the sake of clearer illustration. The schematic drawings are merely exemplary and do not limit the interpretations of the present invention in any way. In the specification and the drawings, components that have substantially the same functions as those described before with reference to a previous drawing(s) bear the identical reference signs thereto, and detailed descriptions thereof may be omitted.

In this specification, the expressions "above", "below", "outer" "inner" and the like represent a positional relationship between a component that is a target of attention and another component. For example, with reference to a substrate, a direction separating from the substrate is expressed as "above", and a direction approaching the substrate is expressed as "below". For example, a direction separating from a display region is expressed as "outer", and a direction approaching the display region is expressed as "inner".

Embodiment 1

<Structure of the Liquid Crystal Display Device>

Figure 1:
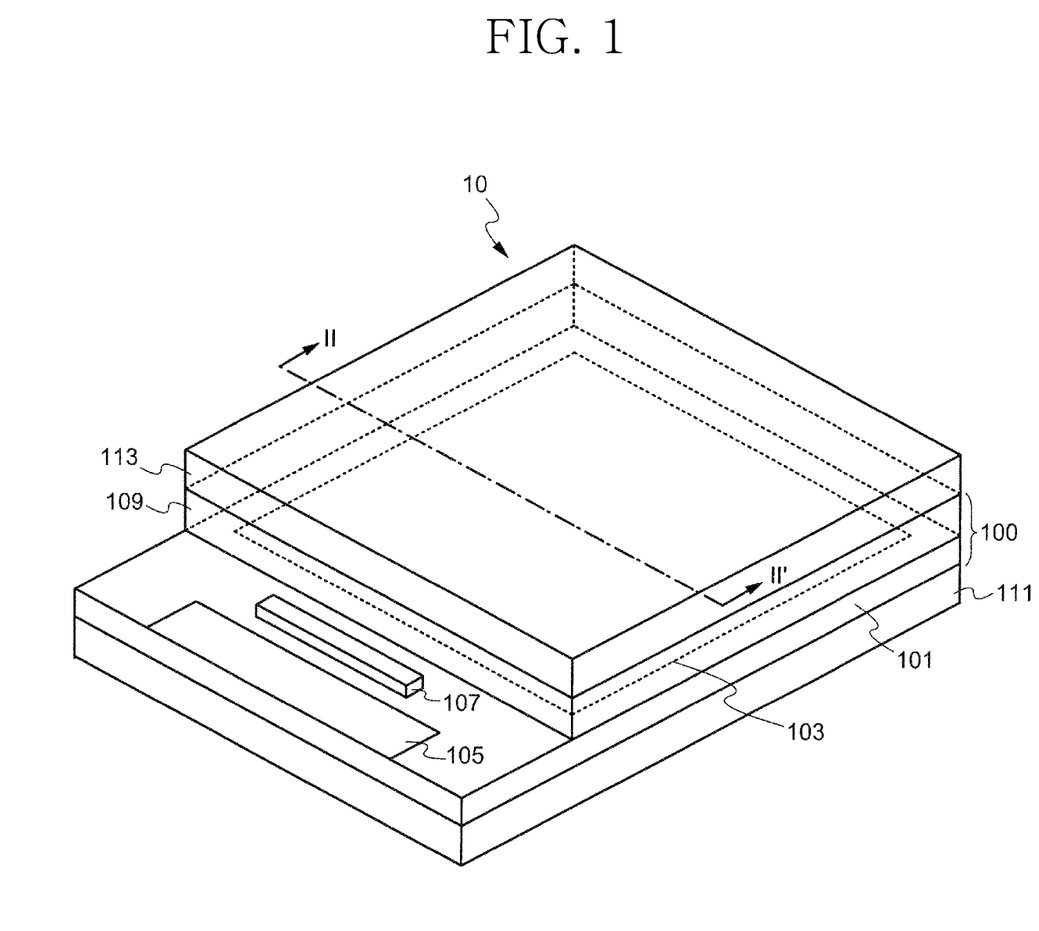
FIG. 1 shows an external structure of a liquid crystal display device 10 in embodiment 1.

FIG. 1 schematically shows an external structure of a liquid crystal display device 10 in embodiment 1. The liquid crystal display device 10 includes an array substrate 101, a display region 103 provided on the array substrate 101, a terminal region 105 supplying an external signal to the display region 103, a driving integrated circuit 107 located between the display region 103 and the terminal region 105, and a counter substrate 109 located to face the array substrate 101. A polarization film 111 is provided adjacent to the array substrate 101, and a polarization film 113 is provided adjacent to the counter substrate 109. As described below, a light-transmissive conductive layer is provided on a top surface of the polarization film 113. The top surface of the polarization film 113 is a display surface.

The array substrate 101 has a plurality of pixel circuits (also referred to simply as "pixels") provided thereon, each including a semiconductor device such as a thin film transistor or the like. The array substrate 101 is also referred to as an "active matrix substrate". The pixel circuits are located in a matrix and form the display region 103. The pixel circuits are each a circuit using a semiconductor device as a switching element, and controls the switching element to be on or off to control the alignment of liquid crystal molecules in a part of a liquid crystal layer 115 (see FIG. 2) that corresponds to the pixel circuit.

FIG. 1 shows an example in which the driving integrated circuit 107 is provided in order to drive thin film transistors included in the display region 103. A gate driver circuit or a source driver circuit formed of thin film transistors may be provided around the display region 103. In this case, the gate driver circuit or the source driver circuit is driven by a driving signal received from the driving integrated circuit 107. The driving integrated circuit 107 may be an external IC chip or the like.

The liquid crystal layer 115 (see FIG. 2) is provided between the array substrate 101 and the counter substrate 109. An assembly of the array substrate 101, the counter substrate 109 and the liquid crystal layer 115 may be referred to as a "liquid crystal cell 100". The counter substrate 109 is bonded to the array substrate 101 with a sealing member 117 (see FIG. 2) formed of a resin material. The counter substrate 109 may include at least one color filter or a black mask (light blocking layer) when necessary. The black mask, when being provided, may be formed by, for example, patterning an insulating layer containing a black pigment.

The polarization films 111 and 113 are optical films having a function of polarizing light incident thereon. In this embodiment, the polarization films are iodine-based. The polarization films are not limited to this.

Figure 2:
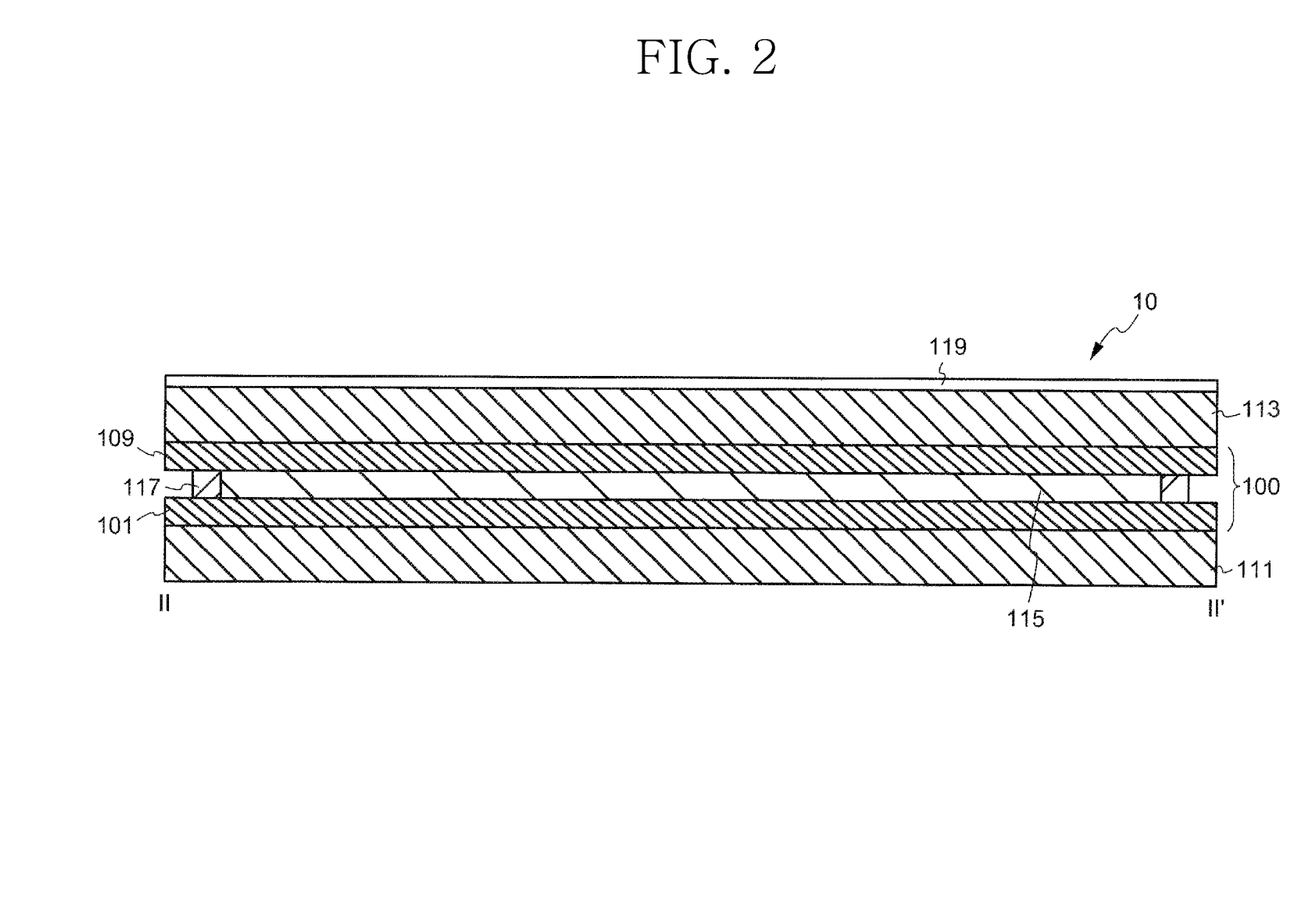
FIG. 2 shows a cross-sectional structure of the liquid crystal display device 10 in embodiment 1.

FIG. 2 schematically shows a cross-sectional structure of the liquid crystal display device 10 in embodiment 1. Specifically, FIG. 2 schematically shows a cross-section of the liquid crystal display device 10 taken along one-dot chain line II-II' shown in FIG. 1.

In FIG. 2, the array substrate 101 and the counter substrate 109 are each a resin film formed of an organic resin material. In this embodiment, polyimide is used as the organic resin material. The organic resin material is not limited to this. For example, the array substrate 101 and the counter substrate 109 may each be a PET (poly(ethylene terephthalate)) film or an FRP (fiber-reinforced plastic) film, instead of a polyimide film.

The array substrate 101 and the counter substrate 109 may each have a thickness of 30 µm or less (representatively, 10 µm or greater and 20 µm or less). As can be seen, in this embodiment, the array substrate 101 and the counter substrate 109 are each formed of a very thin resin layer, and therefore may each be treated as a flexible substrate.

Although not shown in FIG. 2, the plurality of pixel circuits including semiconductor devices are formed on a main surface of the array substrate 101 (surface closer to the liquid crystal layer 115), and form the above-described display region 103. Specifically, pixel electrodes included in the pixel circuits and a common electrode are both provided on the array substrate 101. Such pixel circuits are known as being required to drive the liquid crystal display device in an IPS mode or an FFS mode, and will not be described in detail herein.

The sealing member 117 is provided along an outer periphery of the array substrate 101 to enclose the display region 103. The liquid crystal layer 115 is held in a space enclosed by the array substrate 101, the counter substrate 109 and the sealing member 117. A liquid crystal material forming the liquid crystal layer 115 may be a nematic liquid crystal material or the like. The liquid crystal layer 115 may have positive or negative dielectric anisotropy. The array substrate 101, the counter substrate 109, the liquid crystal layer 115 and the sealing member 117 located as described above form the liquid crystal cell 100 of the liquid crystal display device 10 in this embodiment.

The liquid crystal display device 10 in this embodiment uses iodine-based polarization films as the polarization films 111 and 113. An iodine-based polarization film basically includes a PVA (poly vinyl alcohol) film immersed with an iodine compound and TAC (triacetyl cellulose) films holding the PVA film therebetween. The polarization film usable in this embodiment may be any film with no specific limitation as long as having a polarization function.

In general, a PVA film has a thickness of about 25 to about 30 µm. A TAC film has a thickness of about 30 µm or greater and about 40 µm or less. Therefore, the polarization films 111 and 113 each have a thickness of about 85 µm or greater and about 110 µm or less. As described above, the thickness of each of the array substrate 101 and the counter substrate 109 is 30 µm or less. The thickness of each of the polarization films 111 and 113 is three to four times the thickness of each of the array substrate 101 and the counter substrate 109.

A light-transmissive conductive layer 119 is provided as a measure against electrostatic charges on the polarization film 113 adjacent to the counter substrate 109. The conductive layer 119 may be a film formed of, for example, a conductive polymer. Examples of the usable conductive polymer include polythiophene, polyacetylene, polyphenylenevinylene, polypyrrole, polyaniline and the like. For forming a film formed of a conductive polymer, a conductive polymer mixed in a solvent (such a mixture is also referred to as a "conductive polymer ink") may be applied to the polarization film 113 and baked to volatilize the solvent.

Alternatively, the conductive layer 119 may be a transparent conductive layer. Such a transparent conductive layer may be formed of a metal oxide such as, for example, ITO (Indium Tin Oxide), which is tin-containing indium oxide. For forming a transparent conductive film of ITO, ITO mixed in a solvent (such a mixture is also referred to as an "ITO ink") may be applied to the polarization film 113 and baked to volatilize the solvent.

The conductively layer 119 is not limited to any of the above, and may be any conductive layer that is sufficiently light-transmissive to be used for a display. For example, even a metal layer that is sufficiently thinned to be light-transmissive, or that has a microscopic pattern, is usable as the conductively layer 119.

For driving the liquid crystal display device 10 in this embodiment, the common electrode and the conductive layer 119 in the liquid crystal cell 100 are set to have the same potential. Because of such a setting, the influence of electrostatic charges generated by, for example, a user contacting the touch panel is blocked by the conductive layer 119 acting as an electric shield. This prevents an inconvenience that an electric field for driving the liquid crystal molecules included in the liquid crystal layer 115 is disturbed by the influence of the electrostatic charges externally provided.

In addition, the conductive layer 119 is provided on an outer surface of the polarization film 113 (namely, on the display plane). Therefore, the distance between the conductive layer 119 and the liquid crystal layer 115 is long. Namely, even though a predetermined potential is provided to the conductive layer 119, the liquid crystal layer 115 is not likely to be influenced by the potential. For example, the thickness of the counter substrate 109 is 30 µm or less (representatively, 10 µm or greater and 20 µm or less), and the thickness of the polarization film 113 provided on the counter substrate 109 is 70 µm or greater and 110 µm or less (representatively, 90 µm or greater and 110 µm or less). Therefore, assuming that the liquid crystal layer 115 has a thickness of 3 µm or greater and 4 µm or less, the distance between the liquid crystal layer 115 and the conductive layer 119, namely, a total thickness of the components between the liquid crystal layer 115 and the conductive layer 119 (i.e., the polarization film 113 and the second substrate 109), is at least 10 times (preferably, at least 20 times) the thickness of the liquid crystal layer 115.

As described above, in the liquid crystal display device 10 in this embodiment, the conductive layer 119 is provided on the outer surface of the polarization film 113, and therefore, a measure against electrostatic charges is provided while the influence of the measure on the liquid crystal layer 115 is suppressed. As a result, even if electrostatic charges are generated by an operation made on the touch panel or the like, a reliable display performance is guaranteed with the image not being disturbed.

<Method for Producing the Liquid Crystal Display Device>

Now, a method for producing the liquid crystal display device 10 in this embodiment will be described with reference to FIG. 3A through FIG. 6B. FIG. 3A through FIG. 6B each show a step of the method for producing the liquid crystal display device 10 in embodiment 1. For the sake of convenience, one liquid crystal cell 100 is shown. In an actual production process, a large glass substrate is used as a support substrate, and a plurality of liquid crystal cells 100 are produced at the same time.

Figure 3A:
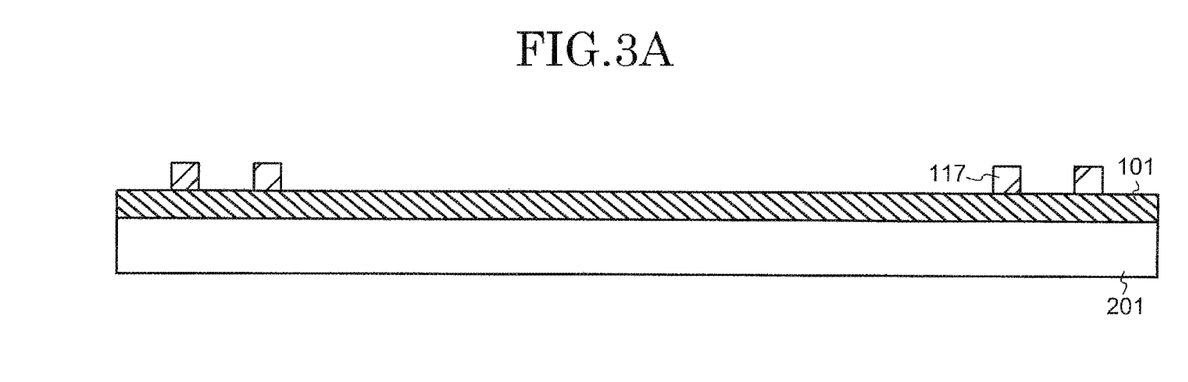
FIG. 3A shows a step of a method for producing the liquid crystal display device 10 in embodiment 1.

First, as shown in FIG. 3A, the array substrate 101 is formed on a glass substrate 201. Specifically, a resin layer formed of polyimide and having a thickness of about 3 µm or greater and about 30 µm or less is formed on the glass substrate 201, and components such as the thin film transistors, the pixel electrodes, the common electrode and the like are formed thereon by use of a thin film semiconductor process. As a result, a plurality of pixel circuits drivable by the IPS mode or the FFS mode is formed on the array substrate 101.

After the array substrate 101 is formed on the glass substrate 201, the sealing member 117 is formed. In this embodiment, the sealing member 117 is formed of an ultraviolet-curable epoxy-based resin. The sealing member 117 is not limited to this.

Figure 3B:
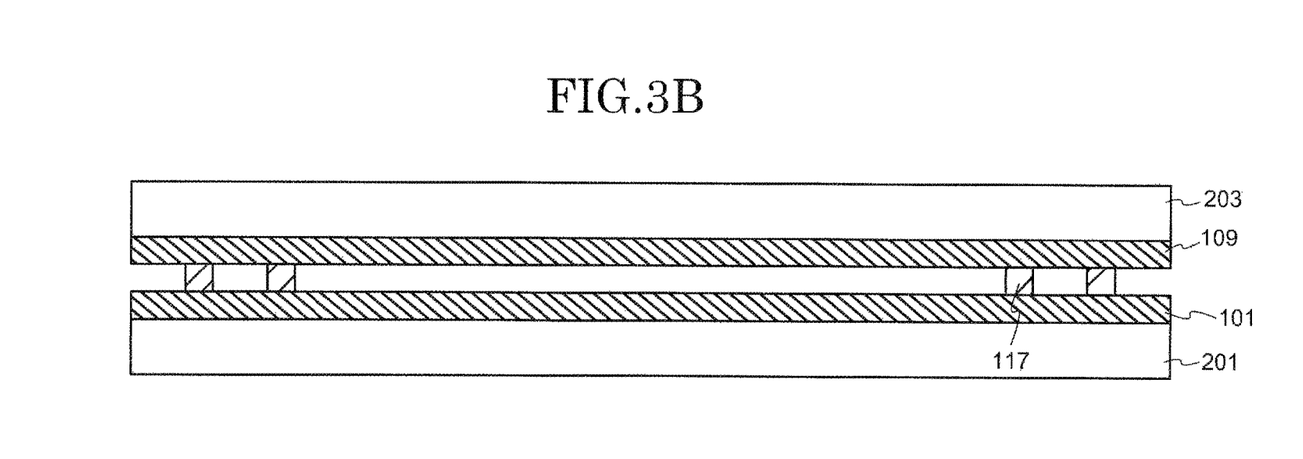
FIG. 3B shows a step of the method for producing the liquid crystal display device 10 in embodiment 1.

After the sealing member 117 is formed, the counter substrate 109 prepared in advance is bonded to the array substrate 101 as shown in FIG. 3B. The counter substrate 109 is formed of a thin resin layer of polyimide or the like, and is formed on a glass substrate 203, like the array substrate 101. Namely, in the step shown in FIG. 3B, the assembly of the glass substrate 203 and the counter substrate 109 is bonded to the array substrate 101 with the sealing member 117. In this step, at least one color filter or a black mask may be provided on the counter substrate 109 when necessary.

Figure 4A:
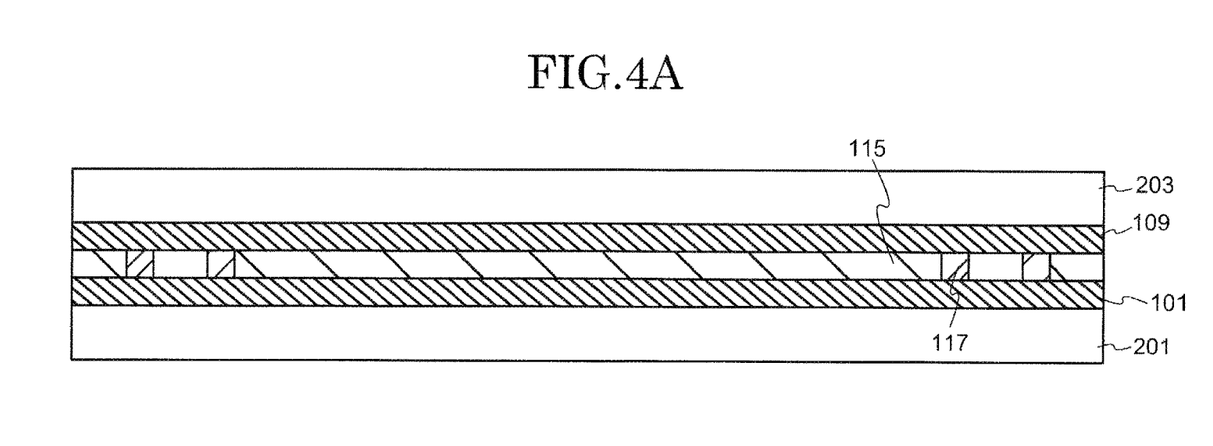
FIG. 4A shows a step of the method for producing the liquid crystal display device 10 in embodiment 1.

After the array substrate 101 and the counter substrate 109 are bonded together with the sealing member 117, the liquid crystal layer 115 is formed as shown in FIG. 4A. The liquid crystal layer 115 may be formed as follows. An opening is formed in advance in a part of the sealing member 117, and a liquid crystal material is injected by use of a vacuum-differential pressure method. After the liquid crystal material is injected, the opening is closed by a material same as that of the sealing member 117. In this manner, the liquid crystal layer 115 is formed in the space enclosed by the array substrate 101, the counter substrate 109 and the sealing member 117. Alternatively, the liquid crystal layer 115 may be formed by use of an ODF (One Drop Fill) method, by which a liquid crystal material is dropped to an area enclosed by the sealing member 117.

Figure 4B:
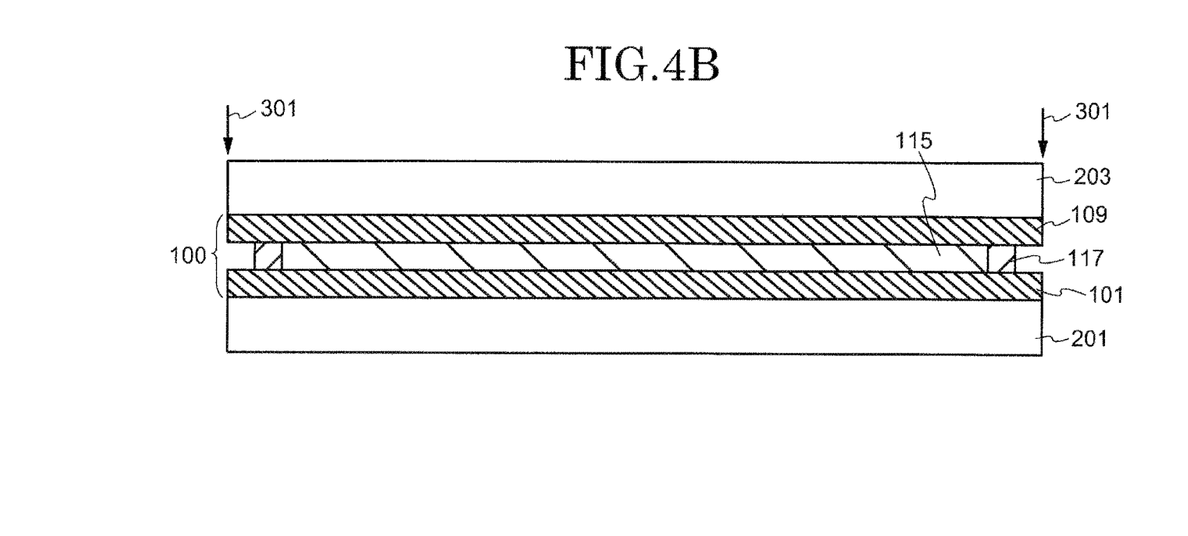
FIG. 4B shows a step of the method for producing the liquid crystal display device 10 in embodiment 1.

Next, as shown in FIG. 4B, a cutting process of cutting the glass substrates 201 and 203 is performed. The cutting process may be performed by use of a known scribing technology. The cutting process may be performed by use of, for example, a cutter or laser light. Lines along which the glass substrates 201 and 203 are cut are set between adjacent liquid crystal cells as represented by arrows 301.

In this embodiment, the method for producing the liquid crystal display device 10 is described regarding the cross-section taken along line II-II' in FIG. 1. Therefore, the glass substrates 201 and 203 are cut at the same position. In a part including the terminal region 105, only the glass substrate 203 needs to be selectively cut away.

In the manner described above, a state where the liquid crystal cell 100 is formed between the two glass substrates 201 and 203 is provided.

Figure 5A:
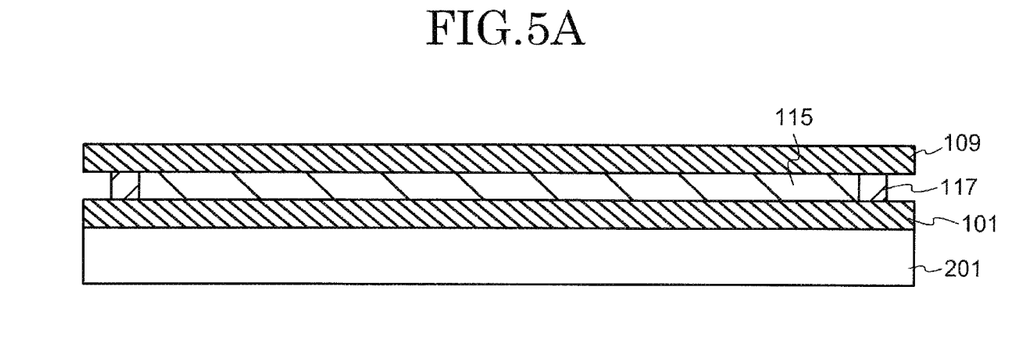
FIG. 5A shows a step of the method for producing the liquid crystal display device 10 in embodiment 1.

Next, as shown in FIG. 5A, the glass substrate 203 is peeled off. In this case, first, ultraviolet light is directed through the glass substrate 203 to weaken the adhesiveness at the interface between the glass substrate 203 and the counter substrate 109. Then, the glass substrate 203 is mechanically peeled off from the counter substrate 109. For example, the glass substrate 203 is adsorbed by an adsorbing member to be pulled off from the counter substrate 109. Thus, the glass substrate 203 is peeled off from the counter substrate 109.

Figure 5B:
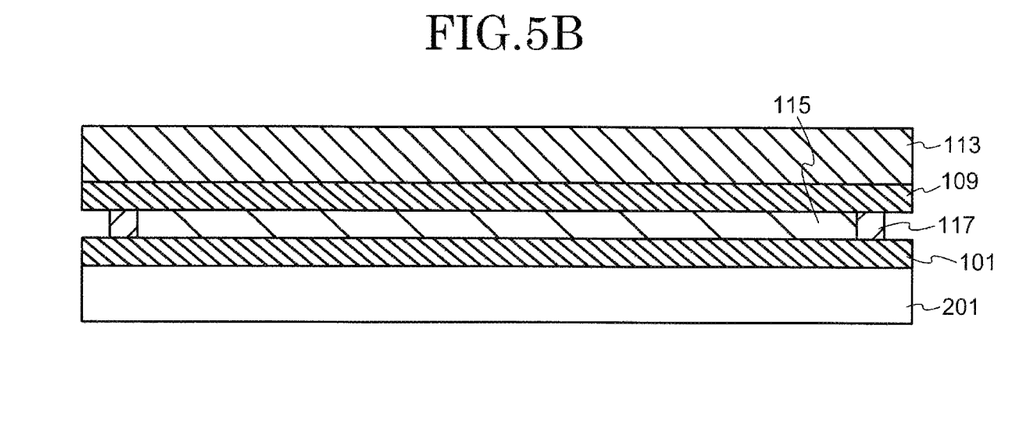
FIG. 5B shows a step of the method for producing the liquid crystal display device 10 in embodiment 1.

After the glass substrate 203 is peeled off, the polarization film 113 is bonded to the counter substrate 109 as shown in FIG. 5B. The polarization film 113 may be bonded with a known adhesive layer. Although not shown, in this embodiment, the polarization film 113 is an iodine-based polarization film including an iodine-containing PVA film and two TAC films holding the PVA film therebetween as described above.

Figure 6A:
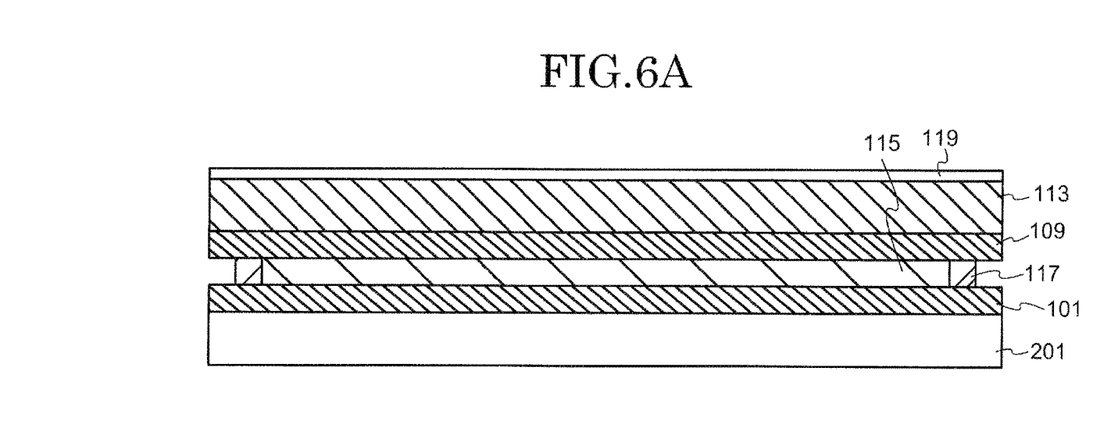
FIG. 6A shows a step of the method for producing the liquid crystal display device 10 in embodiment 1.

Next, as shown in FIG. 6A, the conductive layer 119 is formed on the polarization film 113. In this embodiment, the conductive layer 119 is formed of a conductive polymer film. Any other film that may be formed adjacent to the polarization film 113 is usable. In this embodiment, PEDOT/PSS, which is a type of polythiophene-based polymer is used as the conductive polymer.

In this embodiment, a conductive polymer mixed in a solvent is applied to the polarization film 113 by spin-coating and heated (i.e., baked) to volatilize the solvent. In this manner, the conductive layer 119 of a conductive polymer is formed on the polarization film 113. In this case, a baking step is needed. Therefore, it is preferable to select the material of the conductive layer 119 in sufficient consideration of the heat-resistant temperature of the liquid crystal cell 100 and the polarization film 113.

In the case where ITO is used instead of the conductive polymer as a material of the conductive layer 119, ITO mixed in a solvent may be applied to the polarization film 113 and baked. Thus, the conductive layer 119 is formed. In this case, a transparent conductive film of ITO is formed as the conductive layer 119. The transparent conductive film formed of ITO is highly light-transmissive and thus improves the luminance of the liquid crystal display device 10.

Figure 6B:
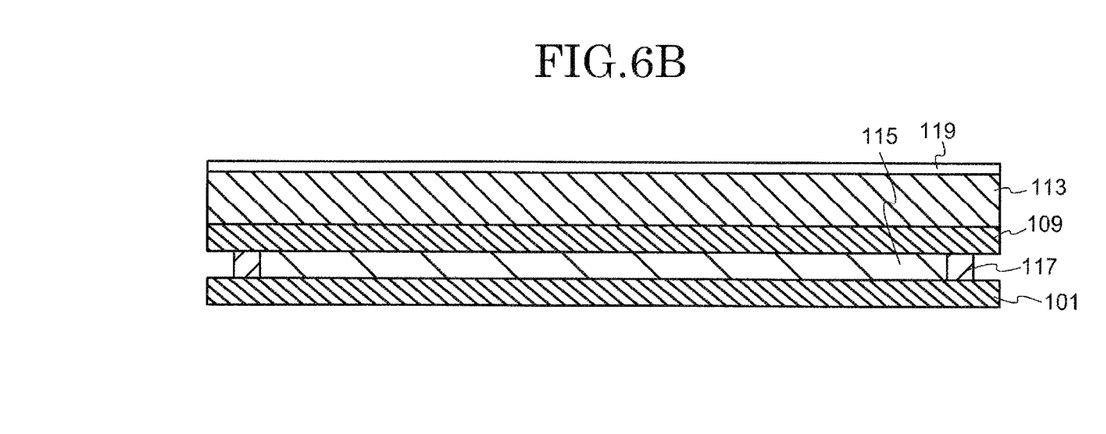
FIG. 6B shows a step of the method for producing the liquid crystal display device 10 in embodiment 1.

After the conductive layer 119 is formed, the glass substrate 201 is peeled off as shown in FIG. 6B. The glass substrate 201 may be peeled off in the same manner as for the glass substrate 203. Namely, ultraviolet light may be directed through the glass substrate 201 to weaken the adhesiveness at the interface between the glass substrate 201 and the array substrate 101. Then, the glass substrate 201 may be peeled off from the array substrate 101.

Then, the polarization film 111 is bonded to the array substrate 101 to produce the liquid crystal display device 10 show in FIG. 2. As the polarization film 111, the same type of film as the polarization film 113 is usable.

In the above-described example, the conductive layer 119 covers the entire surface of the liquid crystal layer 100. Alternatively, the conductive layer 119 may have a pattern. The conductive layer 119 has a role of providing a path by which electrostatic charges generated outside escape. As long as this role is provided, the conductive layer 119 may have a pattern.

For forming the conductive layer 119 having a pattern by, for example, an application method, a dispenser method, an inkjet method or the like that allows the solution to be applied selectively may be used. With such a method, the conductive layer 119 having a pattern is formed in a manner of drawing an image on the polarization film 113.

As described above, in the liquid crystal display device 10 in this embodiment, the conductive layer 119 having a pattern may be provided on the polarization film 113 to provide a measure against electrostatic charges. In this case, the light transmittance of an area without the conductive layer 119 is higher than the light transmittance of an area with the conductive layer 119. Therefore, the luminance is improved as a whole.

Embodiment 2

<Structure of the Liquid Crystal Display Device>

Hereinafter, a liquid crystal display device 20 in embodiment 2 will be described with reference to FIG. 7. Unlike in the liquid crystal display device 10 in embodiment 1, in the liquid crystal display device 20 in embodiment 2, the conductive layer 119 is formed on a cover member 205 (a kind of a third substrate), and the conductive layer 119 and the polarization film 113 are bonded together with an adhesive layer 207. In this embodiment, the differences from embodiment 1 will be mainly described, and the components same as those in the liquid crystal display device 10 in embodiment 1 will bear the same reference signs thereto and descriptions thereof may be omitted.

Figure 7:
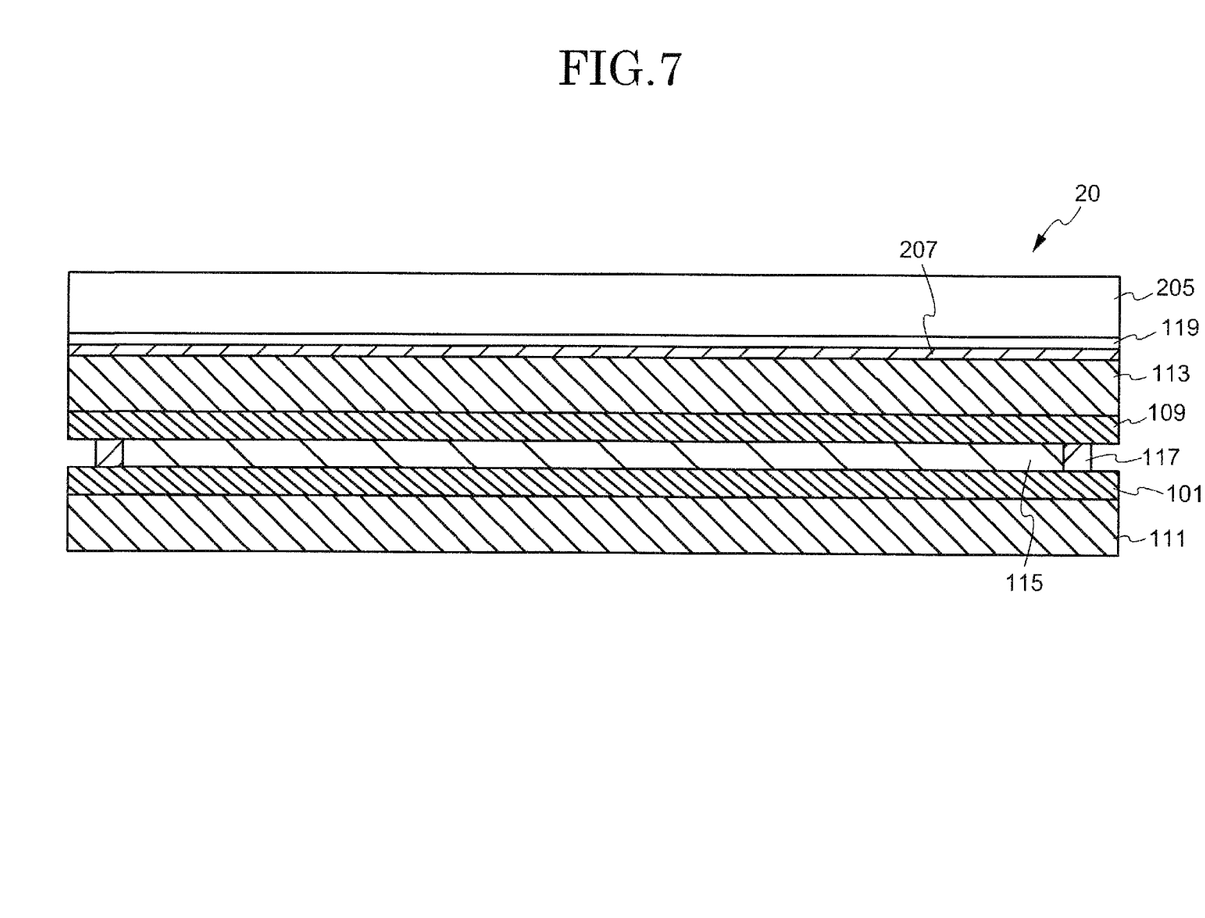
FIG. 7 shows a cross-sectional structure of a liquid crystal display device 20 in embodiment 2.

FIG. 7 schematically shows a cross-sectional structure of the liquid crystal display device 20 in embodiment 2. As described above, the conductive layer 119 and the cover member 205 are bonded to the polarization film 113 with the adhesive layer 207. The third substrate (e.g. The cover member 205) may be formed of a glass material or a plastic material. It is preferable that the cover member 205 is formed of a glass material in order to protect the liquid crystal display device 20. The adhesive layer 207 may contain conductive particles to be conductive.

As described above, in this embodiment, the conductive layer 119 is formed on the cover member 205 in advance, and then the polarization film 113 and the conductive layer 119 are bonded together by use of the adhesive layer 207. Therefore, the material of the conductive layer 119 may be selected with no consideration of the heat-resistant temperature of the liquid crystal layer 100 or the polarization film 113. This increases the degree of freedom in selecting the conductive polymer. As a result, an appropriate conductive polymer may be selected in accordance with the conductivity or transmittance required of the conductive layer 119.

There is no specific limitation on the material of the adhesive layer 207 as long as the adhesive layer 207 is sufficiently light-transmissive to be used for a display. For example, an adhesive layer used to bond the counter substrate 109 and the polarization film 113 may be used.

<Method for Producing the Liquid Crystal Display Device>

Figure 8A:
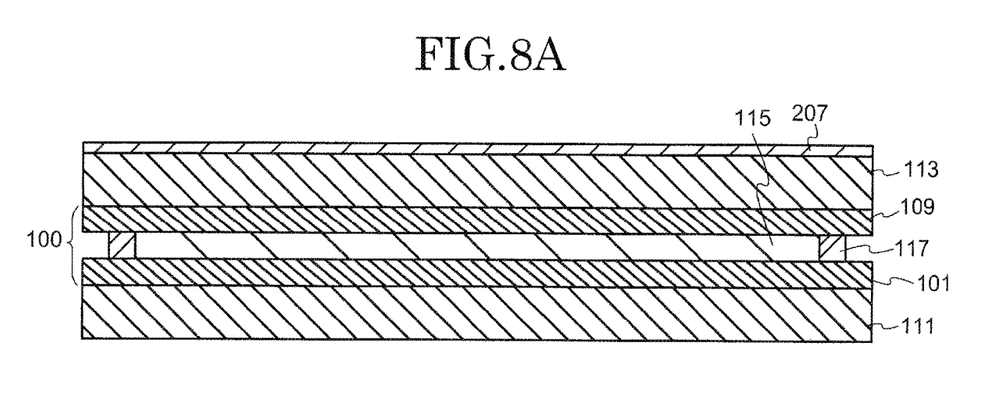
FIG. 8A shows a step of a method for producing the liquid crystal display device 20 in embodiment 2.
Figure 8B:
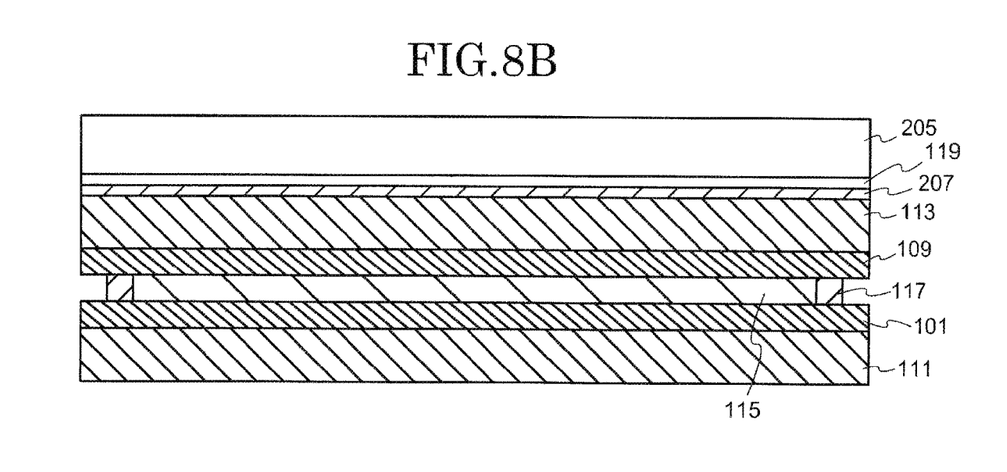
FIG. 8B shows a step of the method for producing the liquid crystal display device 20 in embodiment 2.

Now, a method for producing the liquid crystal display device 20 in this embodiment will be described with reference to FIG. 8A and FIG. 8B. FIG. 8A and FIG. 8B each show a step of the method for producing the liquid crystal display device 20 in embodiment 2. First, as shown in FIG. 8A, an assembly of the liquid crystal cell 100 and the two polarization films 111 and 113 holding the liquid crystal cell 100 therebetween is formed by the steps described in embodiment 1. As described above, the liquid crystal cell 100 includes the array substrate 101, the counter substrate 109, the sealing member 117 and the liquid crystal layer 115.

Then, the adhesive layer 207 is formed on the polarization film 113 by applying the material of the adhesive layer 207. The adhesive layer 207 may be formed by a technology such as spin-coating, printing or the like.

Next, an assembly of the cover member 205 (formed of a cover glass in this embodiment) and the conductive layer 119 formed on the cover member 205 is prepared, and as shown in FIG. 8B, is bonded to the assembly of the liquid crystal cell 100 and the two polarization films 111 and 113 by use of the adhesive layer 207. As a result, the polarization film 113 and the conductive layer 119 are bonded together with the adhesive layer 207 to form the liquid crystal display device 20 shown in FIG. 8B.

In this embodiment, the conductive layer 119 is formed on the cover member 205 by a step separate from the steps for forming the assembly shown in FIG. 8A. Therefore, it is not necessary to consider the heat-resistant temperature of the liquid crystal cell 100 or the polarization film 111 or 113, unlike in embodiment 1. As can be seen, in this embodiment, any of various methods may be selected for forming the conductive layer 119. For example, a conductive material such as a conductive polymer, ITO or the like mixed in a solvent may be applied, or a transparent conductive layer of ITO or the like may be formed by use of a vapor deposition method such as a sputtering method or the like, as in embodiment 1.

In the above-described example, the conductive layer 119 covers the entire surface of the liquid crystal layer 100. Alternatively, the conductive layer 119 may have a pattern, like in embodiment 1. In this case, the conductive layer 119 may be formed by an application method or a sputtering method, and then may be patterned by photolithography. In this embodiment, the conductive layer 119 is first formed on the cover member 205. Therefore, no problem occurs even if patterning by photolithography is performed.

Alternatively, a conductive layer having a pattern may be directly formed by an application method such as an inkjet method or the like. In this case, conductive particles of silver or the like may be dispersed in a solvent, and the solvent may be selectively applied to form a pattern of the conductive layer.

As described above, in embodiment 2, like in embodiment 1, the conductive layer 119 having a pattern may be provided on the polarization film 113 to provide a measure against electrostatic charges. In this case also, the light transmittance of an area without the conductive layer 119 is higher than the light transmittance of an area with the conductive layer 119. Therefore, the luminance is improved as a whole.

Embodiment 3

<Structure of the Liquid Crystal Display Device>

Hereinafter, a liquid crystal display device 30 in embodiment 3 will be described with reference to FIG. 9 and FIG. 10. Unlike in the liquid crystal display device 20 in embodiment 2, in the liquid crystal display device 30 in embodiment 3, a conductive layer provided as a measure against electrostatic charges is a line pattern formed of a metal layer or a transparent conductive layer and also acts as one electrode of a touch panel. In this embodiment, the differences from embodiment 2 will be mainly described, and the components same as those in the liquid crystal display device 20 in embodiment 2 will bear the same reference signs thereto and descriptions thereof may be omitted.

Figure 9:
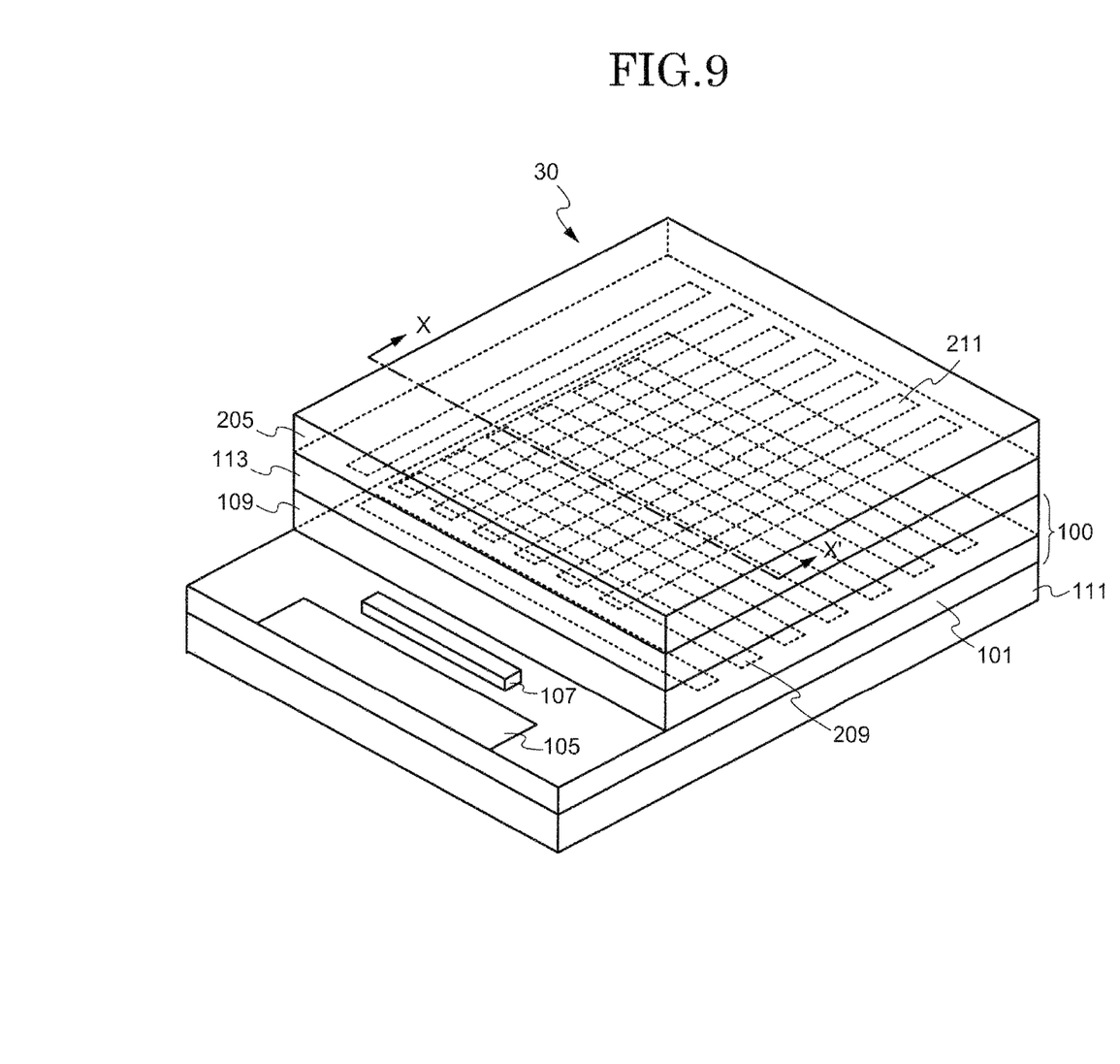
FIG. 9 shows an external structure of a liquid crystal display device 30 in embodiment 3.
Figure 10:
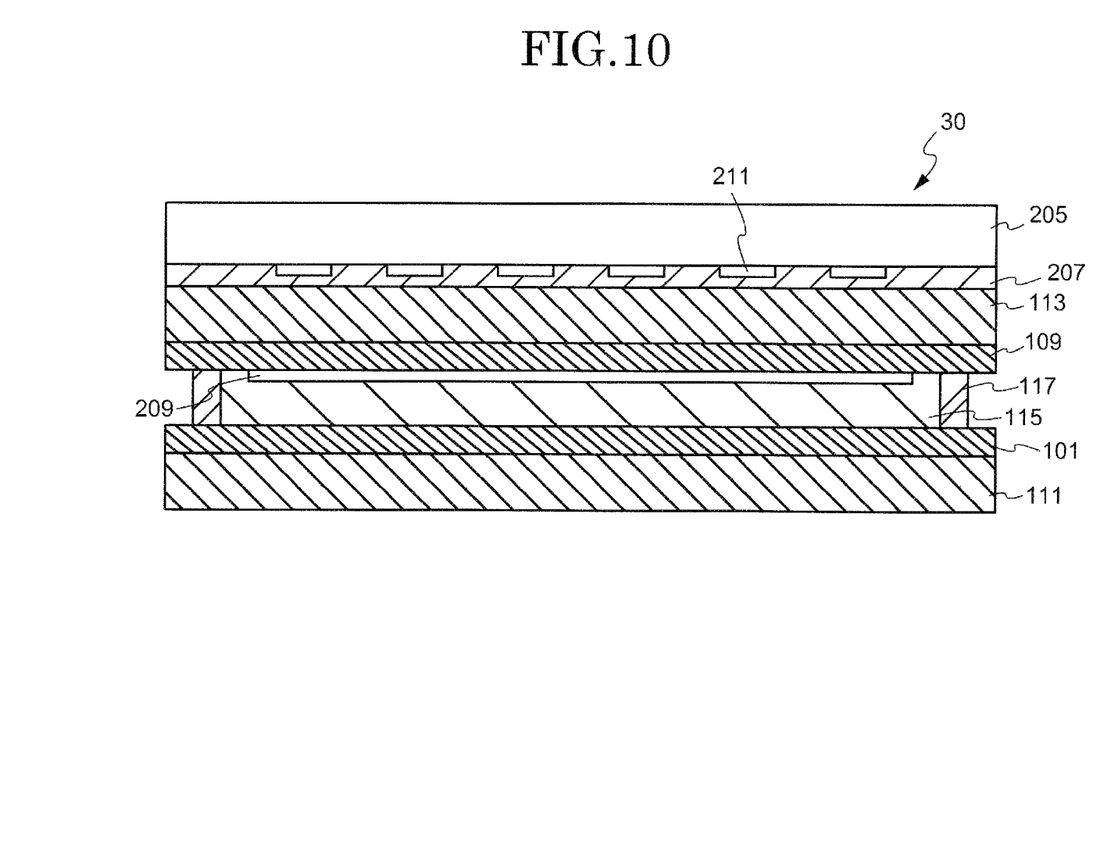
FIG. 10 shows a cross-sectional structure of the liquid crystal display device 30 in embodiment 3.

FIG. 9 schematically shows an external structure of the liquid crystal display device 30 in embodiment 3. FIG. 10 schematically shows a cross-sectional structure of the liquid crystal display device 30 in embodiment 3. Specifically, FIG. 10 schematically shows a cross-section of the liquid crystal display device 30 taken along one-dot chain line X-X' shown in FIG. 9.

The liquid crystal display device 30 in this embodiment includes a first line pattern 209 formed of a metal layer between the counter substrate 109 and the liquid crystal layer 115. The first line pattern 209 may be formed of a transparent conductive layer after a resin layer acting as the counter substrate 209 is formed. The liquid crystal display device 30 also includes a second line pattern 211 formed of a metal layer between the polarization film 113 and the cover member 205.

The second line pattern 211 may be formed as follows, for example. A metal layer or a transparent conductive layer is formed by use of a vapor deposition method such as a sputtering method or the like on the cover member 205 formed of a hard material such as glass or the like. Then, the metal layer or the transparent conductive layer is patterned by photolithography.

In this embodiment, the second line pattern 211 is formed on the cover member 205. Therefore, it is not necessary to consider the heat-resistant temperature of the liquid crystal cell 100 or the polarization film 113. The cover member 205 is resistant against moisture, and therefore, there is no restriction on the use of photolithography. As a result, there are effects that a metal layer or a transparent conductive layer having a good film quality and a low resistance value may be formed by a vapor deposition method, and that the second line pattern 211 is realized with a high degree of freedom of design by photolithography. Alternatively, the second line pattern 211 may be directly formed by use of an application method such as an inkjet method or the like.

In the liquid crystal display device 30 in this embodiment, the second line patter 211 has a function of a shield against electrostatic charges and also a function of one electrode of the touch panel (scanning electrode or detection electrode). The above-described effects are especially effective to cause the second line pattern 211 to act as one electrode of the touch panel.

In the case where the second line pattern 211 is formed of a metal layer, it is preferable that the second line pattern 211 has a sufficiently small width to provide a large gap between parts of the pattern, for the following reason. The gap between the parts of the pattern acts as a light-transmissive area and therefore, enlarging the light-transmissive area as much as possible is important to prevent the luminance from decreasing.

In the case where the second line pattern 211 is formed of a metal layer, a metal layer having a lower resistance than that of a conductive layer formed of a conductive polymer or a transparent conductive layer formed of ITO or the like is usable. Therefore, the electrostatic charges generated by the operation made by the user on the touch panel are allowed to escape outside quickly.

Modification

In embodiments 1, 2 and 3 described above, the liquid crystal cell 100 is held between the polarization films. When necessary, optical films other than the polarization films may be used. Such an optical film may be at least one of a phase film, a viewing angle enlarging film, a luminance increasing film, and a reflection film, instead of the polarization film.

Any of the above-described optical films provided between the conductive layer acting as a shield against electrostatic charges and the liquid crystal cell allows a measure against electrostatic charges to be provided while the influence thereof on the liquid crystal layer is suppressed.

Display devices described above in embodiments according to the present invention may have an element added thereto, or deleted therefrom, or may be changed in design optionally by a person of ordinary skill in the art. Methods for producing a display device described above in embodiments according to the present invention may have a step added thereto, or deleted therefrom, or may be changed in a condition optionally by a person of ordinary skill in the art. Such display devices and methods for producing the same are encompassed in the scope of the present invention as long as including the gist of the present invention.

Even functions and effects that are different from those provided by the above-described embodiments but are obvious from the description of this specification or are easily expectable by a person of ordinary skill in the art are naturally construed as being provided by the present invention.

What is claimed is:

1. A display device, comprising:
   a first substrate having a pixel electrode provided thereon;
   a second substrate formed of a resin material;
   a display element layer provided between the first substrate and the second substrate;
   an optical film facing the display element layer with the second substrate being provided between the optical film and the display element layer; and
   a conductive layer facing the second substrate;
   wherein the optical film is provided between the conductive layer and the second substrate.

2. The display device according to claim 1, wherein the second substrate has a thickness of 30 μm or less.

3. The display device according to claim 1, wherein the conductive layer is a layer containing a conductive polymer.

4. The display device according to claim 1, further comprising a color filter between the display element layer and the second substrate.

5. The display device according to claim 1, further comprising a third substrate facing the optical film, the third substrate having the conductive layer;
   wherein the conductive layer is provided between the third substrate and the optical film.

6. The display device according to claim 5, wherein the conductive layer is formed on the third substrate and has a pattern.

7. The display device according to claim 1, wherein a total thickness of the components between the display element layer and the conductive layer is at least ten times a thickness of the display element layer.

8. The display device according to claim 1, further comprising an insulating layer containing a black pigment between the display element layer and the second substrate.

9. The display device according to claim 1, wherein the first substrate is formed of a resin material.

10. The display device according to claim 2, wherein the conductive layer is a layer containing a conductive polymer.

11. The display device according to claim 2, further comprising a color filter between the display element layer and the second substrate.

12. The display device according to claim 3, further comprising a color filter between the display element layer and the second substrate.

13. The display device according to claim 2, further comprising a third substrate facing the optical film, the third substrate having the conductive layer;
    wherein the conductive layer is provided between the third substrate and the optical film.

14. The display device according to claim 3, further comprising a third substrate facing the optical film, the third substrate having the conductive layer;
    wherein the conductive layer is provided between the third substrate and the optical film.

15. The display device according to claim 4, further comprising a third substrate facing the optical film, the third substrate having the conductive layer;
    wherein the conductive layer is provided between the third substrate and the optical film.

16. The display device according to claim 2 wherein a total thickness of the components between the display element layer and the conductive layer is at least ten times a thickness of the display element layer.

17. The display device according to claim 3 wherein a total thickness of the components between the display element layer and the conductive layer is at least ten times a thickness of the display element layer.

18. The display device according to claim 4, wherein a total thickness of the components between the display element layer and the conductive layer is at least ten times a thickness of the display element layer.

19. The display device according to claim 2, further comprising an insulating layer containing a black pigment between the display element layer and the second substrate.

20. The display device according to claim 1, wherein the display element layer is a liquid crystal layer.

* * * * *